(12) United States Patent
Aryafar et al.

(10) Patent No.: US 10,876,765 B2
(45) Date of Patent: Dec. 29, 2020

(54) SYSTEMS AND METHODS OF THERMAL ENERGY STORAGE

(71) Applicant: Element 16 Technologies, Inc., Glendale, CA (US)

(72) Inventors: Hamarz Aryafar, Glendale, CA (US); Karthik Nithyanandam, Richmond, CA (US); Parker Wells, Kensington, CA (US)

(73) Assignee: Element 16 Technologies, Inc., Glendale, CA (US)

( * ) Notice: Subject to any disclaimer, the term of this patent is extended or adjusted under 35 U.S.C. 154(b) by 68 days.

(21) Appl. No.: 16/296,118

(22) Filed: Mar. 7, 2019

(65) Prior Publication Data

US 2020/0166244 A1    May 28, 2020

Related U.S. Application Data

(60) Provisional application No. 62/772,125, filed on Nov. 28, 2018.

(51) Int. Cl.
*F28D 17/00* (2006.01)
*F24H 7/04* (2006.01)
*F28D 20/00* (2006.01)

(52) U.S. Cl.
CPC ....... *F24H 7/0433* (2013.01); *F28D 20/0056* (2013.01); *F28D 2020/0004* (2013.01)

(58) Field of Classification Search
CPC ............... F24H 7/0433; F28D 20/0056; F28D 2020/0004

USPC .......................................................... 165/10
See application file for complete search history.

(56) References Cited

U.S. PATENT DOCUMENTS

| | | | |
|---|---|---|---|
| 4,110,987 A | 9/1978 | Cahn et al. | |
| 4,505,261 A * | 3/1985 | Hunter | F24S 10/95 |
| | | | 126/635 |
| 4,524,756 A | 6/1985 | Laverman | |
| 4,643,212 A | 2/1987 | Rothrock | |
| 5,239,839 A | 8/1993 | James | |
| 6,158,499 A | 12/2000 | Rhodes et al. | |
| 7,723,858 B2 | 5/2010 | Nayef et al. | |
| 9,360,234 B2 | 6/2016 | Harats | |
| 2005/0279292 A1 | 12/2005 | Hudson | |

(Continued)

FOREIGN PATENT DOCUMENTS

| CN | 102221303 B | 8/2012 |
|---|---|---|
| CN | 203518746 U | 4/2014 |

(Continued)

*Primary Examiner* — Davis D Hwu
(74) *Attorney, Agent, or Firm* — Lynch LLP

(57) ABSTRACT

Thermal energy storage systems are disclosed in this application. Systems of the inventive subject matter are designed to reduce maintenance requirements by sequestering, for example, corrosive fluids that might otherwise damage difficult-to-fix internal components are kept out of those components by introducing a non-corrosive heat transfer fluid to facilitate heat transfer between a thermal energy storage medium (e.g., molten sulfur) and a potentially corrosive working fluid. Thus, the potentially corrosive fluid is kept out of a thermal energy storage tank containing the thermal energy storage medium, which, by design, is difficult to repair when internal components corrode or otherwise require maintenance.

12 Claims, 6 Drawing Sheets

(56) References Cited

U.S. PATENT DOCUMENTS

| | | |
|---|---|---|
| 2009/0211726 A1 | 8/2009 | Bank et al. |
| 2010/0230075 A1 | 9/2010 | Mathur et al. |
| 2011/0162829 A1 | 7/2011 | Xiang |
| 2011/0259552 A1 | 10/2011 | Sterzel |
| 2012/0125019 A1* | 5/2012 | Sami .................... F24F 5/0046 62/79 |
| 2012/0227926 A1* | 9/2012 | Field .................... F24D 11/004 165/10 |
| 2012/0241122 A1 | 9/2012 | Xiang et al. |
| 2013/0049368 A1 | 2/2013 | Kaufmann et al. |
| 2013/0105106 A1 | 5/2013 | Goswami |
| 2015/0204618 A1 | 7/2015 | Owens et al. |
| 2015/0241137 A1 | 8/2015 | France |
| 2015/0267566 A1* | 9/2015 | Vamvas ................ F28D 20/026 60/786 |

FOREIGN PATENT DOCUMENTS

| | | |
|---|---|---|
| CN | 103868390 A | 6/2014 |
| DE | 102012204081 A1 | 9/2013 |
| EP | 2369288 A1 | 9/2011 |
| WO | 2014124747 A1 | 8/2014 |
| WO | 2016099289 A1 | 6/2016 |

\* cited by examiner

SYSTEMS AND METHODS OF THERMAL ENERGY STORAGE

FIELD OF THE INVENTION

The field of the invention is thermal energy storage.

BACKGROUND

The background description includes information that may be useful in understanding the present invention. It is not an admission that any of the information provided in this application is prior art or relevant to the presently claimed invention, or that any publication specifically or implicitly referenced is prior art.

Thermal energy storage allows excess thermal energy to be stored and used hours, days, or months later, at scales ranging from individual process, building, multiuser-building, district, town, or region. Many current technologies store heat by using a "dirty" working fluid to transfer heat to and from a thermal energy storage medium. One example of a dirty working fluid is hot pressurized water containing corrosive, scaling, and fouling properties. If a dirty fluid is used directly in, for example, a sulfur heat storage system, it would cause internal heat transfer surfaces to be fouled, scaled, or corroded. Because materials and components within such a system that directly contact the dirty working fluid are submerged within molten sulfur, extraordinary measures are required to implement fixes or repairs.

As exemplified by U.S. Pat. Nos. 5,239,839, 4,643,212, and US20090211726, prior efforts to curb or prevent corrosion caused by a dirty working fluid have focused on encapsulating a thermal energy storage media inside pipes or capsules and then implementing, e.g., corrosion inhibitors or coatings that are corrosion resistant to enable the use of dirty working fluids. But because such systems undergo thermal cycling, having different expansion coefficients between, e.g., metals and corrosion resistant coatings on those metals can dramatically reduce the durability of the coatings. Solutions that involve encapsulating a thermal storage medium within pipes or capsules lead to a high storage cost, and thermal storage media in the literature are typically molten salt phase change materials or solid-state storage media that exhibit slow discharge rate due to a conduction-dominated process. Systems configured this way necessitate encapsulating a storage media in small geometries to enhance surface area per unit volume, which increases the cost and the pumping power requirement to move a heat transfer fluid through the storage system.

It has been discovered that required maintenance issues related to the heat storage can be greatly reduced by using a heat transfer fluid that will not foul, scale, or corrode the internal heat transfer surfaces of a sulfur-based thermal energy storage system. Dirty fluid can still be used, but others in this space have failed to consider systems that improve system reparability and longevity by keeping dirty working fluids out of the most complicated components of thermal energy storage systems. This can be accomplished by creating a system whereby a dirty working fluid can transfer heat to and from a heat transfer fluid that can in turn transfer heat to and from a thermal energy storage medium (e.g., molten sulfur).

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that systems can be designed to store thermal energy whereby repair and maintenance requirements can be dramatically reduced through the use of a heat transfer fluid that acts as a go-between between a thermal energy storage medium (e.g., molten sulfur) and a potentially corrosive working fluid.

SUMMARY OF THE INVENTION

The present invention provides apparatuses, systems, and methods directed to thermal energy storage.

In one aspect of the inventive subject matter, a thermal energy storage system is contemplated. The system includes: a thermal energy storage tank configured to contain a thermal energy storage medium; a plurality of tubes disposed within the thermal energy storage tank, wherein the plurality of tubes are configured to contain a heat transfer fluid and to facilitate heat transfer between the thermal energy storage medium and the heat transfer fluid; a heat exchanger coupled with the plurality of tubes, wherein the heat exchanger is configured to facilitate heat transfer between the heat transfer fluid and a working fluid; and a pump configured to move the heat transfer fluid between the heat exchanger and the plurality of tubes.

In some embodiments, the thermal energy storage medium comprises molten sulfur. The heat transfer fluid can include a thermal oil, and it is contemplated as being non- or minimally-corrosive. In some embodiments, the working fluid contacts the heat exchanger without contacting any other portion of the system, thereby preventing corrosion in more difficult-to-repair portions of the system. The heat transfer fluid transports heat between the working fluid and the thermal energy storage medium (e.g., either to or from, depending on whether the system is in a charging configuration or a discharging configuration).

Some embodiments feature a second heat exchanger configured to facilitate heat transfer from the heat transfer fluid to a cold working fluid (e.g., in a discharging configuration). Some embodiments can also include a supplemental burner positioned between the thermal energy storage tank and the heat exchanger that is configured to add heat to the heat transfer fluid as it moves between the thermal energy storage tank and the heat exchanger (e.g., in a discharging configuration).

Some embodiments also include a second heat exchanger along with two sets of valves, wherein the two sets of valves are configured to change the system from a charging configuration to a discharging configuration, where, in the charging configuration, heat is transferred from the working fluid to the heat transfer fluid to the thermal energy storage medium and, in the discharging configuration, heat is transferred from the thermal energy storage medium to the heat transfer fluid to a second working fluid.

In another aspect of the inventive subject matter, a method of storing thermal energy is contemplated. The method includes the steps of: pumping a working fluid through a heat exchanger; pumping a heat transfer fluid through the heat exchanger; pumping the heat transfer fluid into a plurality of tubes disposed within a thermal energy storage tank where the thermal energy storage tank contains a thermal energy storage medium (e.g., molten sulfur or a molten sulfur-mixture) and where heat is exchanged between the heat transfer fluid and the thermal energy storage medium; and pumping the heat transfer fluid back to the heat exchanger.

In some embodiments, heat is transferred from the working fluid to the heat transfer fluid in the heat exchanger, and heat is transferred from the heat transfer fluid to the thermal energy storage medium in the thermal energy storage tank (e.g., in a charging configuration where heat is added to the thermal energy storage medium). In some embodiments, heat is transferred from the heat transfer fluid to the working fluid in the heat exchanger, and heat is transferred from the thermal energy storage medium to the heat transfer fluid in the thermal energy storage tank (e.g., in a discharging configuration where heat is removed from the thermal energy storage medium). In some embodiments, the heat transfer fluid is a thermal oil. It is preferably a non- or minimally-corrosive fluid.

One should appreciate that the disclosed subject matter provides many advantageous technical effects including systems that are configured to minimize costly repairs by sequestering corrosive fluids from hard-to-repair internal components of a thermal energy storage tank.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
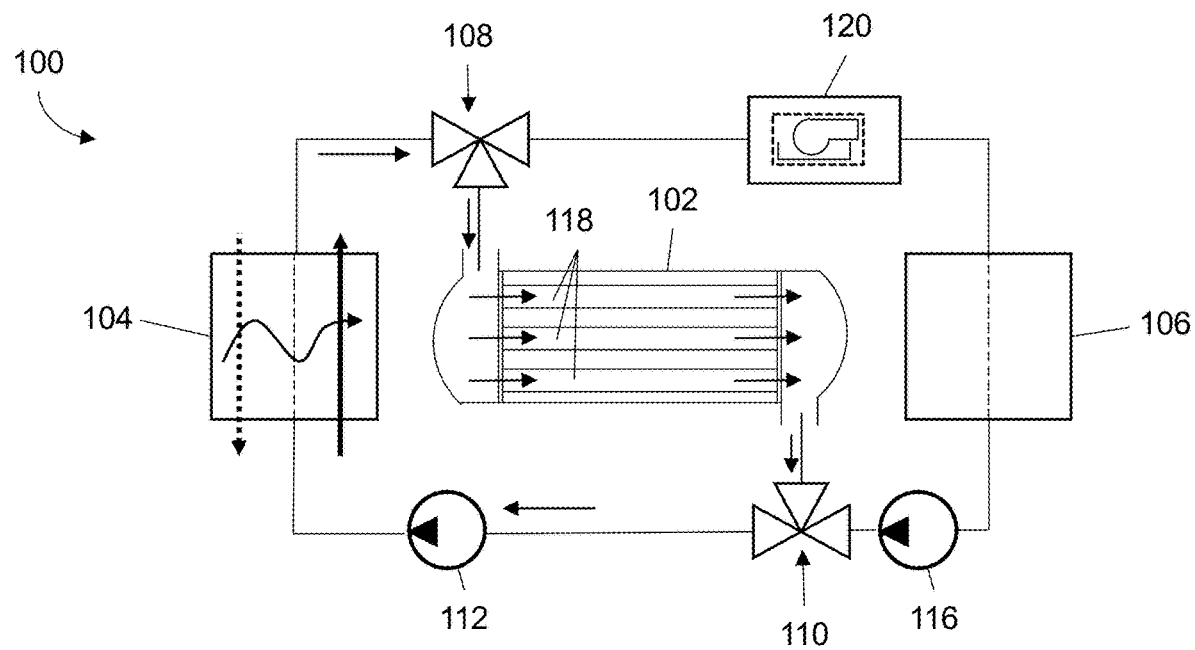
FIG. 1 is a schematic of a thermal energy storage system having two heat exchangers and two pumps in a charging configuration.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Systems of the inventive subject matter are designed to store thermal energy using sulfur or sulfur-based mixtures (both pure sulfur and sulfur mixtures are referred to as "sulfur" in this application for the sake of brevity). Often heat is carried or stored by a "dirty" working fluid like hot pressurized water containing corrosive, scaling, and fouling properties, where the term "dirty" is used to refer to these undesirable properties of a working fluid. If a dirty working fluid is used in a sulfur heat storage system, internal heat transfer surfaces that contact the dirty working fluid become fouled, scaled, or corroded. Furthermore, because these surfaces are ordinarily submerged in molten sulfur, repairs are exceedingly difficult to carry out. It is thus advantageous to use a heat transfer fluid that will not foul, scale, or corrode internal heat transfer surfaces within a thermal energy storage tank, significantly reducing the occurrence of maintenance issues in such systems. It has been discovered that using external heat exchangers to handle dirty working fluids can completely externalize fouling, scaling, and corrosion and associated maintenance issues maintenance issues in systems of the inventive subject matter.

External heat exchangers solve the problem of scaling, fouling, and corrosion inside the sulfur thermal storage by moving those issues to an external component that can easily be accessed. It also means that an off the shelf heat exchanger can be used where those issued have already been engineered into the design. This alleviates the need for the sulfur thermal storage to be engineered to deal with scaling, fouling, and corrosion.

Thus, systems of the inventive subject matter include subsystems implemented to reduce—and in some instance eliminate—the occurrence of difficult-to-repair damage caused by the use of dirty working fluids. Systems of the inventive subject matter are configured to operate with at least three different materials: sulfur, a heat transfer fluid, and a working fluid. Sulfur (e.g., molten sulfur) is contained within a thermal energy storage tank, the heat transfer fluid passes between the thermal energy storage tank and one or more external heat exchangers, and a working fluid moves through the one or more heat exchangers to pull heat from the heat transfer fluid.

With this configuration, systems of the inventive subject matter can operate in two different modes: charging and discharging. In a charging state, as shown in FIG. 1, a heat transfer fluid carries heat into the thermal energy storage tank. During discharge, a heat transfer fluid carries heat out of the thermal energy storage tank (e.g., the heat transfer fluid temperature when it enters the thermal energy storage tank is at least a lower temperature than the molten sulfur within the tank). In any event, a heat transfer fluid is pumped in to the thermal energy storage tank to facilitate heat transfer from the sulfur to the heat transfer fluid (or vice versa), and external (e.g., external to the thermal energy storage tank) heat exchangers circulate the heat transfer fluid to allow heat to transfer from the heat transfer fluid to the working fluid (or vice versa). The working fluid functions as a source or sink for the stored heat.

To prevent contamination and reaction with the sulfur, the heat transfer fluid is contained within pipes, tubes, or some other metal or metal-based structure that prevents mixing of the heat transfer fluid with the sulfur contained within the thermal energy storage tank 102. Thus, in the charging state, hot heat transfer fluid is pumped into the thermal energy storage tank 102, and in the discharge state, cold heat transfer fluid is pumped into the thermal energy storage tank 102. The working fluid is the source or sink of the stored heat.

FIG. 1 shows an embodiment of thermal energy storage system 100 in a charging state. The thermal energy storage system 100 shown in FIG. 1 includes a thermal energy storage tank 102, two heat exchangers 104 & 106, two sets of valves 108 & 110, a series of tubes 112 running through the thermal energy storage tank 102, and an optional supplemental burner 120.

The heat exchangers 102 & 104 are designed to transfer heat between a heat transfer fluid and a working fluid, where the heat transfer fluid is designed to move heat to or from the thermal energy storage tank 102. In some embodiments, the heat transfer fluid is a thermal oil. Thermal oil is useful in this portion of the system because it does not cause corrosion or other damaging degradation within the tubes that are housed in the thermal energy storage tank 102, especially when compared to using a dirty water within a thermal energy storage tank 102. Thermal oil is just one example of a heat transfer fluid that can be used in this portion of the system 100. Other fluids that can be used instead of a thermal oil should have similar material properties.

A desirable heat transfer fluid should have properties that allow low maintenance operation of the system 100 without giving rise to a need to make the thermal energy storage tank 102 or its internal tubes 118 to be made from, e.g., expensive alloys that are resistant to corrosion or from materials that would require constant or frequent cleaning of the heat transfer surfaces. It is also contemplated that the heat transfer fluid can be a phase-changing (e.g., liquid-vapor) fluid. The term "fluid" in this context refers to both liquids and gasses.

A desirable heat transfer fluid should be non-corrosive, non-toxic, and have a low pour point (e.g., less than 200° F., 210° F., 220° F., 230° F. 240° F., 250° F., 260° F., 270° F., or 280° F., where the pour point of a liquid is the temperature below which the liquid loses its flow characteristics) allowing it to flow even at low temperatures. Good heat transport properties such as high specific heat (>2-2.5 kJ/kg-K) are desirable. The heat transfer fluid should have good thermal stability (e.g., a fluid that does not break down or degrade significantly during normal use) in an operating temperature range of 20° F. to 700° F. Single phase heat transfer fluids should have high boiling/flash/fire points (low vapor pressure) for safe operation in non-pressurized closed system. Contemplated high boiling points include 450-700° F., contemplated flash points include 240-700° F., and high fire points include 240-700° F.

Heat exchangers 102 & 104 facilitate heat transfer between a working fluid and a heat transfer fluid. Heat exchangers 102 & 104 are located outside of the thermal energy storage tank 102 because they are designed to come into contact with the dirty or corrosive working fluid, and an external location facilitates maintenance and low-cost replacement of the heat exchangers. By sequestering the dirty working fluid to smaller, easier-to-replace components like the heat exchangers, the overall system 100 becomes much easier to maintain.

Figure 2:
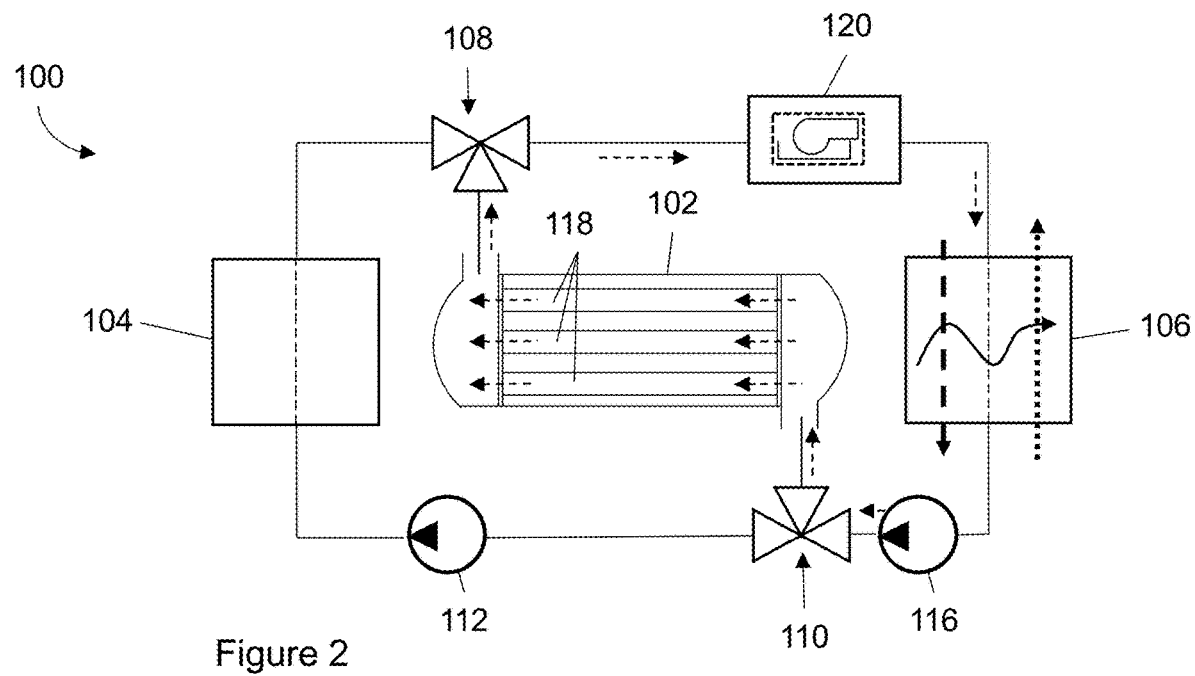
FIG. 2 is a schematic of the embodiment shown in FIG. 1 in a discharging configuration.

Although FIGS. 1 & 2 (and other figures in this application) show each component in each system in a specific position relative to other components, it is contemplated that other configurations are possible without deviating from the inventive subject matter. For example, a pump in any embodiment can be placed on either side of a heat exchanger so that heat transfer fluid can either be pushed or pulled through the heat exchanger.

To function within systems of the inventive subject matter, heat exchangers should be made of materials that can withstand high temperatures (e.g., between 400° F. and 2000° F.; preferably between 700° F. and 1000° F. or between 700° F. and 1500° F.) and can withstand thermal shock (thermal shock occurs, e.g., when a thermal gradient causes different parts of an object to expand by different amounts). Commercially available plate heat exchangers or shell and tube heat exchangers can be used. Heat exchanger effectiveness (heat exchanger effectiveness is the ratio between the actual heat transfer rate and the maximum possible heat transfer rate) above 0.7 is desirable and can be achieved by implementing, for example, counter flow heat exchangers. Heat exchangers made using materials with anti-fouling coatings are desirable to minimize fouling caused by the working fluid (e.g., dirty water).

The two sets of valves 108 & 110 are implemented to facilitate reconfiguring the thermal energy storage system 100 from a charging state (as shown in FIG. 1) to a discharging state (as shown in FIG. 2). Details about charging and discharging are described below. When the system 100 is in a charging configuration, values 108 & 110 are configured such that the heat transfer fluid moves through the system according to the solid arrows, with the heat transfer fluid flowing through the heat exchanger 104 on the left and then passing through the tubes 118 that run through the thermal energy storage tank 102. In the heat exchanger, the heat transfer fluid is heated by the working fluid and then in the thermal energy storage tank 102, the heat transfer fluid transfers that heat into the sulfur. This adds heat to the system thereby "charging" the sulfur with thermal energy. In a charging state, heat transfer fluid does not flow through the right side of the system, and this pump 116 is deactivated when the system is charging.

Pump 112 motivates the heat transfer fluid to move through the system when it is in a charging configuration, and pump 116 motivates the heat transfer fluid to move through the system when it is in a discharging configuration. Because of the material properties of the heat transfer fluid (e.g., viscosity), pumps implemented in systems of the inventive subject matter should meet several specifications. In some embodiments, canned or magnetically coupled pumps can be implemented. Pumps can be sized to the required capacity depending on a particular system's needs. Centrifugal or rotary positive displacement pumps that can handle high temperature fluids (e.g., up to 700-800F when they are made cast iron or low carbon cast steel) are desirable.

In some embodiments, a first heat transfer fluid can be used for charging, while a second heat transfer fluid is used for discharging. This can be accomplished either by including separate circulatory systems for each heat transfer fluid to keep them separated, or by draining one heat transfer fluid from a system and replacing it with another when changing between charging and discharging.

FIGS. 1 & 2 also show an optional supplemental burner 120. A supplementary heat source can be implemented in any embodiment of the inventive subject matter, despite not being shown in every possible schematic—the supplementary heat source 120 shown in FIGS. 1 & 2 should be considered demonstrative as to how such heat sources can be implemented in any other embodiment. The supplemental burner 120 is used to add additional heat to the heat transfer fluid after it exits the thermal energy storage tank 102 so that the heat transfer fluid can transfer even more heat to the working fluid via the heat exchanger 106. Supplementary heat sources can add heat via, for example, burning fuel or by implementing electric heaters. Though the supplemental burner 120 is shown between components valves 108 and heat exchanger 106, it is contemplated that the supplemental burner can be positioned between heat exchanger 104 and valves 108 without deviating from the inventive subject matter. Thus, because every embodiment is capable of being configured to both charge and discharge, supplemental burners can be implemented in any position along closed circuit heat transfer fluid pathways—and in any embodiment described in this application—to assist with either charging or discharging.

Figure 7:
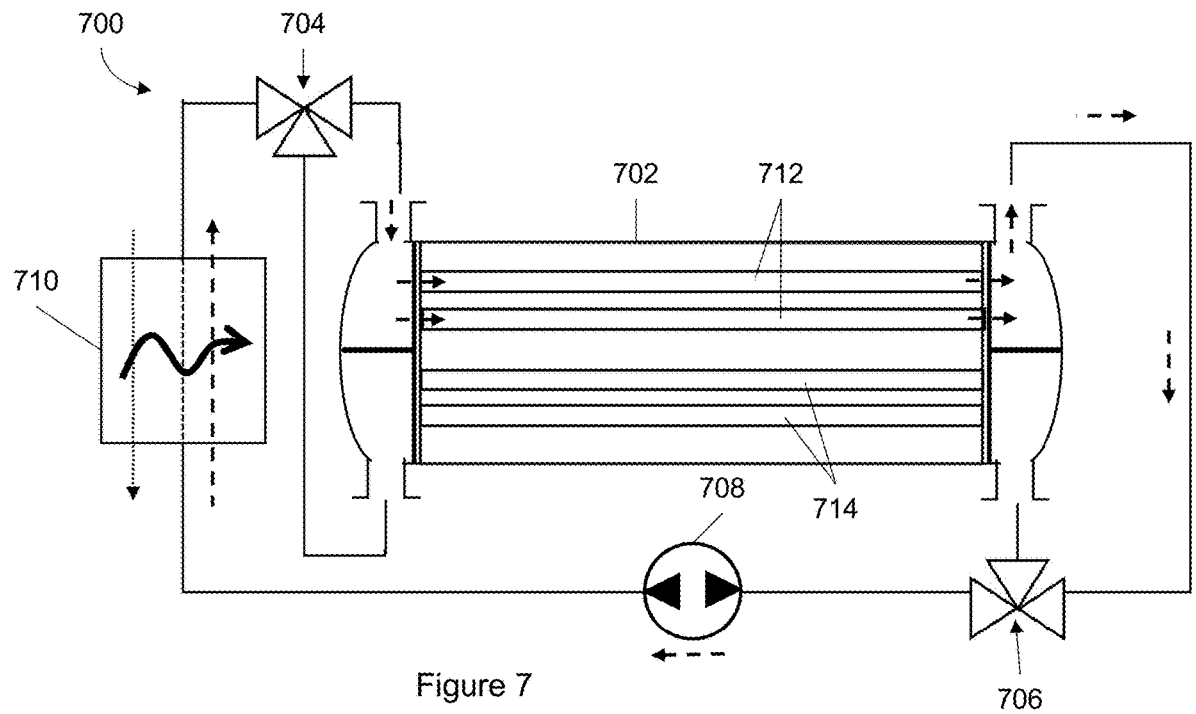
FIG. 7 is a schematic of another embodiment of a thermal energy storage system having one heat exchanger and a bidirectional pump in a charging configuration.
Figure 8:
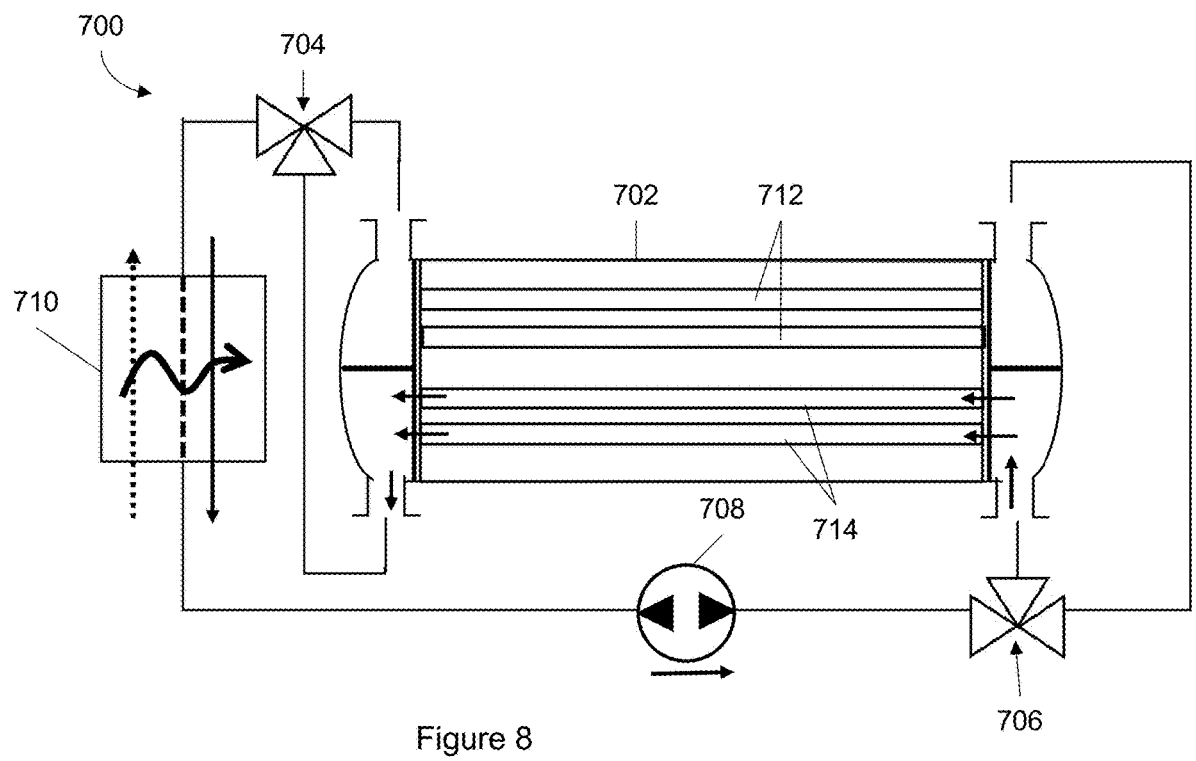
FIG. 8 is a schematic of the embodiment in FIG. 7 in a discharging configuration.

The tubes 118 through which heat transfer fluid flows within the thermal energy storage tank are configured to maximize heat transfer within the thermal energy storage tank 102 while minimizing the likelihood of difficult maintenance issues (e.g., corrosion or other problems requiring replacement). In some embodiments, tubes used for charging systems of the inventive subject matter are located near the bottom of the thermal energy storage tank, and tubes used for discharging systems of the inventive subject matter are located near the top of the thermal energy storage tank. Tubes that are located near the bottom of the thermal energy storage tank can be positioned within the thermal energy storage tank below a mid-line, below a center of mass line, or otherwise positioned so that they are disposed within the thermal energy storage tank so that the cooler thermal energy storage medium that sinks to the bottom of a thermal energy storage tank can be preferentially heated by tubes disposed near the bottom of the tank. FIGS. 7 & 8, for example, show a configuration with one set of tubes disposed in the bottom half of the thermal energy storage tank and another set of tubes disposed in the top half of the thermal energy storage tank. In some embodiments, the tubes in the bottom half are the charging tubes and the tubes in the top half are the discharging tubes, and vice versa in other embodiments.

It is contemplated that tubes disposed within the thermal energy storage tank can be configured to include coils or other physical features and configurations to facilitate more effective heat transfer between the heat transfer fluid and the thermal energy storage medium. For example, in some embodiments, tubes can run vertically in a vertically oriented thermal energy storage tank, and the heat transfer fluid can run through the thermal energy storage tank either bottom to top or top to bottom, depending on whether the system is charging or discharging. Because hotter thermal energy storage medium (e.g., molten sulfur or a molten sulfur mixture) will rise to the top of a thermal energy storage tank, a discharging system can pump the heat transfer fluid through the thermal energy storage tank from bottom to top so that the heat transfer fluid pulls heat from the hottest thermal energy storage medium last and exits the thermal energy storage tank at the hottest temperature. The opposite can be true for a charging configuration: the heat transfer fluid would be pumped into the thermal energy storage tank from top to bottom. Having the hot heat transfer fluid moving from bottom to top is not always desirable as, in some embodiments, this could adversely affect the thermocline region due to flow disturbances as a result of undesirable local natural convection currents in the heat transfer fluid. Although tubes in this application are often referred to in the plural form, it is contemplated that a single tube can be implemented in any one of the embodiments shown in the Figures such that the single tube takes on an appearance of being many tubes by virtue of how many times it is coiled or otherwise configured so that it does simply pass straight through a thermal energy storage tank from one side to the other.

Thermal energy storage tanks of the inventive subject matter can be configured in a variety of ways. Because hotter thermal energy storage medium contained within the thermal energy storage tank rises to the top, it can be advantageous to configure the thermal energy storage tank such that the heat transfer fluid is pumped vertically through pipes within the tank rather than horizontally across the tank. Many thermal energy storage tank configurations are also contemplated, including configurations where the tank is taller than it is wide (e.g., vertically oriented). In some embodiments, in a charging configuration, heat transfer fluid can be pumped through the thermal energy storage tank from top to bottom. In the same way, in a discharging example, cold heat transfer fluid can be pumped through a thermal energy storage tank from bottom to top. Pumping heat transfer fluid in these directions for charging and discharging can improve efficiency. All of the figures in this application depict the internal tubing with the thermal energy storage tanks as being oriented horizontally, but it is contemplated that any of these embodiments can feature heat transfer fluid tubes to be oriented vertically by simply rotating the tubes 90 degrees in either direction without departing from the inventive subject matter.

In an example of system of the inventive subject matter operating in a charging state, an external heat exchanger uses hot pressurized water as the working fluid, and that hot pressurized water exchanges heat with cold heat transfer fluid in the external heat exchanger. Once the heat transfer fluid is heated, it is then circulated through the thermal energy storage tank to store thermal energy in the sulfur (or sulfur mixture) contained therein.

In another state, the thermal energy storage system can "discharge" whereby heat is removed from the thermal energy storage tank, as shown in FIG. 2. To discharge the thermal energy storage system, valves 108 and 110 are configured to allow the heat transfer fluid to move through both the thermal energy storage tank 102 and the heat exchanger 106 on the right side of the system as shown in FIG. 2 (the arrows with dotted lines indicate the direction of flow of the heat transfer fluid). When discharging, the heat transfer fluid is cooled by the working fluid (e.g., heat is transferred from the heat transfer fluid to the working fluid because the working fluid's temperature is lower than the heat transfer fluid's temperature) in the heat exchanger 106, and then the cooled heat transfer fluid is pushed into the thermal energy storage tank 102 by pump 116. As the heat transfer fluid passes through tubes 118, it gathers heat from sulfur that is contained in the thermal energy storage tank 102 and carries it back out to the heat exchanger 106.

In an example of a system of the inventive subject matter operating in a discharging state, a cold heat transfer fluid enters the thermal energy storage tank and is heated by the hot sulfur therein. Then, the hot heat transfer fluid enters an external heat exchanger that has cold water as the working fluid being pumped through it. The cold water is heated (e.g., turned to steam) by the heat transfer fluid, thereby discharging the thermal energy stored in the thermal energy storage tank.

By using a heat transfer material such as a thermal oil, the thermal energy storage tank can be protected from corrosive, scaling, or fouling effects that would otherwise be caused by a dirty working fluid running directly through the thermal energy storage tank. Some examples of dirty working fluids include water produced from a well, water recycled through water processing, water created as a waste stream from steam production, or steam produced through a boiler, direct fire burner, heat recovery steam generator, solar water heating or steam generation, or some combination thereof.

In some embodiments, heat transfer fluid pipes (e.g., tubes 118) and outlet ports can be configured to optimize performance. Working fluid temperature and quality can be regulated by, for example, modulating a flow rate of the heat transfer fluid (e.g., by adjusting pumps 112 and 116) and by changing the port from which heat transfer fluid is extracted during discharge.

Figure 3:
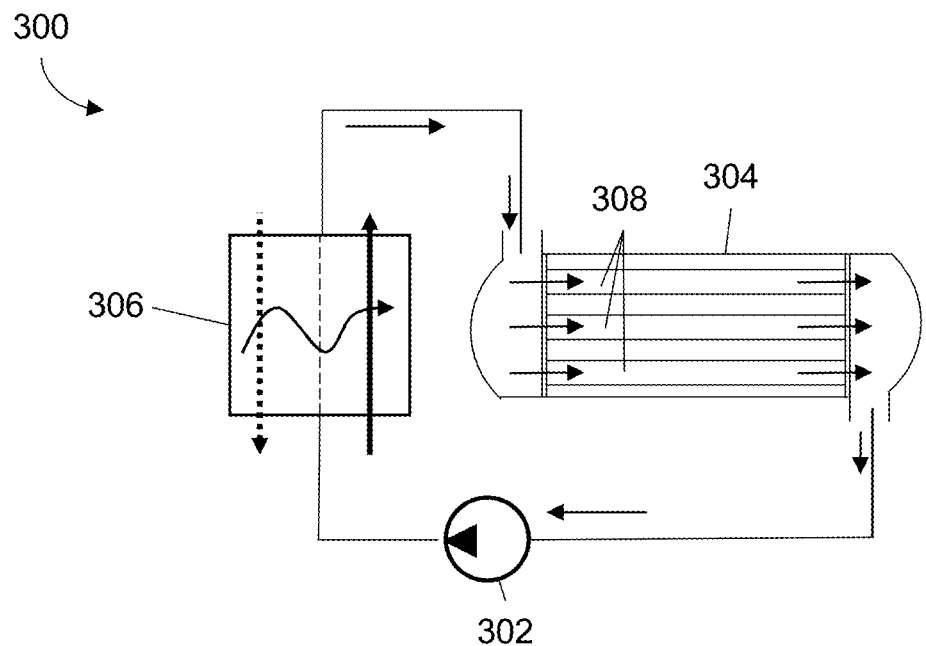
FIG. 3 is a schematic of a thermal energy storage system having one heat exchanger and one pump in a charging configuration.
Figure 4:
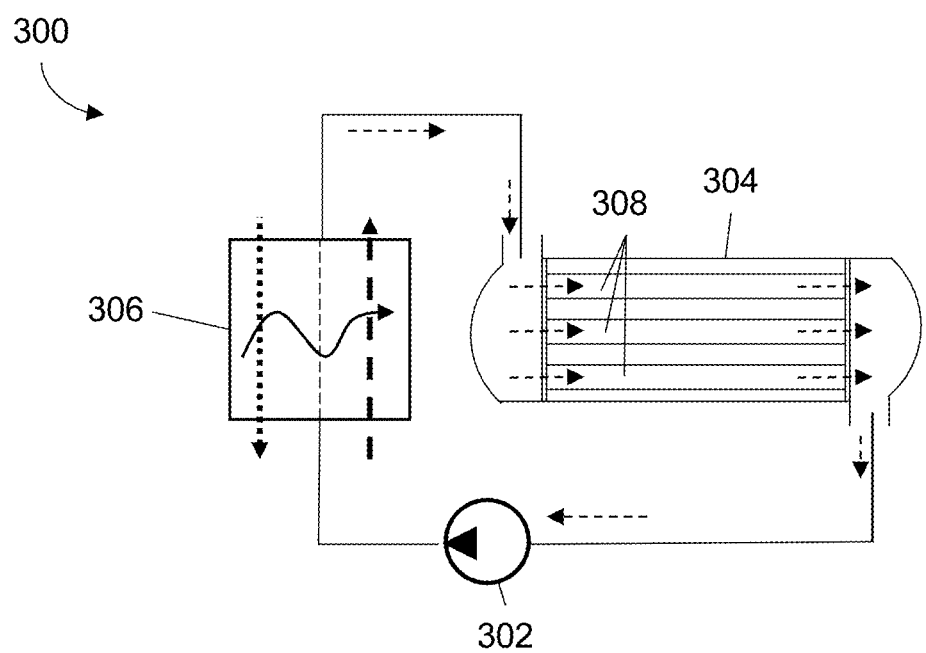
FIG. 4 is a schematic of the embodiment in FIG. 3 in a discharging configuration.

Other configurations of the inventive subject matter are contemplated, all of which are designed to keep dirty working fluid out of the thermal energy storage tank. For example, FIGS. 3 & 4 show another embodiment in a charging configuration (FIG. 3) and in a discharging configuration (FIG. 4). The system 300 shown in FIGS. 3 and 4 includes a pump 302, a thermal energy storage tank 304, and a heat exchanger 306. In a charging configuration, as shown in FIG. 3, a heat transfer fluid is pumped through the thermal energy storage tank in the direction of the solid lines with arrows. The heat exchanger 306 takes in hot working fluid and heat from the working fluid is transferred to the heat transfer fluid, which the pump pushes through the system 300. The heat transfer fluid then moves through the tubes 308 within the thermal energy storage tank 304, thereby transferring heat to the sulfur within the thermal energy storage tank 304, thus charging the system 300 with thermal energy.

FIG. 4 shows the embodiment in FIG. 3 in a discharging configuration. Instead of including valves as in some other embodiments, the lone heat exchanger 306 shown in FIG. 4 handles both the charging and discharging configurations of the system 300. To discharge, instead of taking in hot working fluid at the heat exchanger 306, cold working fluid is taken in, and heat from the heat transfer fluid is transferred to the cold working fluid. After the heat transfer fluid is cooled in the heat exchanger, it is pumped back into the thermal energy storage tank 304 by the pump 302 where it gathers heat from the sulfur within the thermal energy storage tank and the process repeats.

Figure 5:
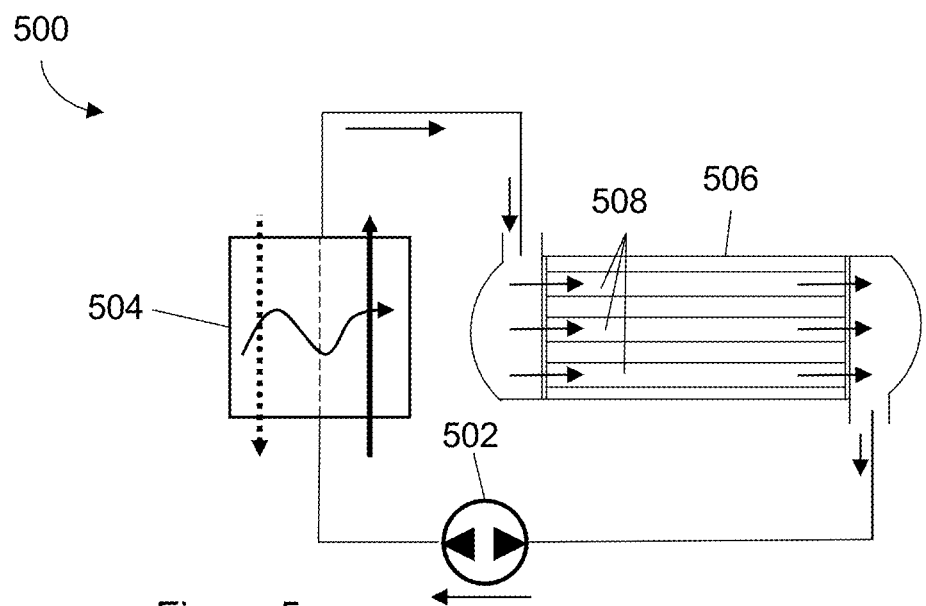
FIG. 5 is a schematic of a thermal energy storage system having one heat exchanger and a bidirectional pump in a charging configuration.
Figure 6:
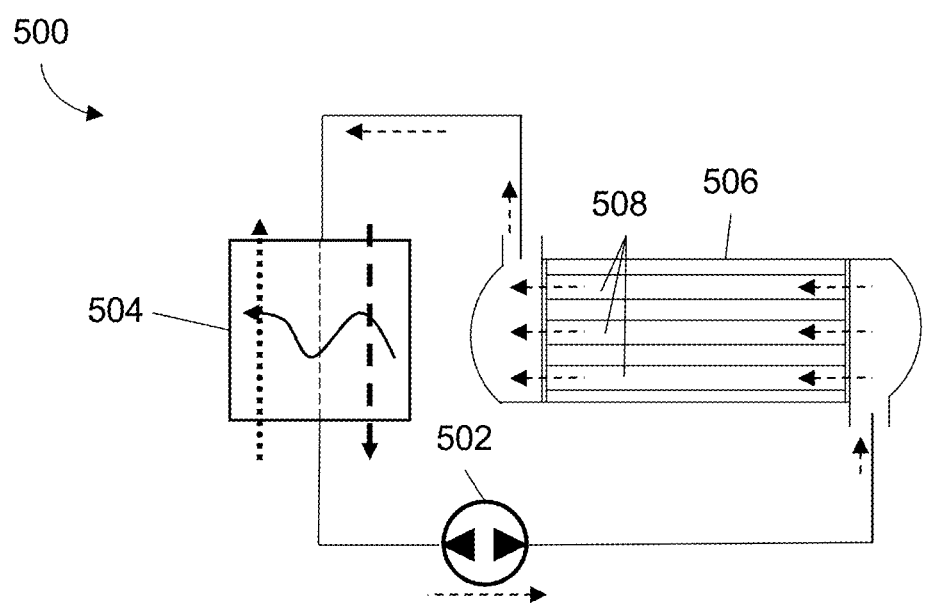
FIG. 6 is a schematic of the embodiment in FIG. 5 in a discharging configuration.

In another embodiment shown in FIGS. 5 & 6, a bidirectional pump 502 is implemented in the system 500, which is largely similar to the system 300 shown in FIGS. 3 & 4. In the charging configuration shown in FIG. 5, the bidirectional pump 502 pushes the heat transfer fluid through the system as indicated by the solid lines with arrows. The heat transfer fluid thus passes through the heat exchanger 504 where, in the charging configuration, a hot working fluid transfers heat to the heat transfer fluid, which the heat transfer fluid then carries to the thermal energy storage tank 506 so that heat from the heat transfer fluid can be transferred to sulfur contained in the thermal energy storage tank when the heat transfer fluid passes through tubes 508.

In a discharging configuration, as shown in FIG. 6, the bidirectional pump 502 pumps the heat transfer fluid in the opposite direction from the charging configuration as shown by the dotted lines with arrows. The heat exchanger 504 takes in cold working fluid to pull heat from the heat transfer fluid, and then the cold heat transfer fluid is pumped into the thermal energy storage tank 506 where it can collect heat from sulfur within the thermal energy storage tank 506 before repeating the cycle, thereby discharging system. It is contemplated that heat exchangers of the inventive subject matter can be run in reverse to so that the heat exchangers operate in a counter-current mode (e.g., as opposed to a parallel mode), thereby improving effectiveness (e.g., heat exchangers run in one mode for charging and in another for discharging). This is why heat exchangers depicted in the Figures show reversed flow between charging and discharging configurations, but it should be understood that reversing heat exchanger flow is not a strict requirement.

The system 700 shown in FIGS. 7 & 8 includes a thermal energy storage tank 702, two sets of valves 704 & 706, a bidirectional pump 708, and a heat exchanger 710. The thermal energy storage tank 702 includes two sets of tubes—a set of tubes for charging 714 and another set for discharging 712. In a discharging configuration, as shown in FIG. 7, valves 704 and 706 are configured to allow the heat transfer fluid to flow through the system according to the dashed lines with arrows. Thus, heat transfer fluid comes out of the heat exchanger 710 at a lowered temperature before being pumped into the discharging tubes 712 contained within the thermal energy storage tank 702. Heat is then transferred from the thermal energy storage medium contained within the thermal energy storage tank 702 to the heat transfer fluid, thereby discharging the system 700. The heat transfer fluid then leaves the thermal energy storage tank 702, passes through valves 706, passes through the pump 708, and then arrives at the heat exchanger 710 to transfer heat to a working fluid before cycling back into the thermal energy storage tank 702 to remove more heat.

In the charging configuration, as shown in FIG. 8, the bidirectional pump 708 causes the heat transfer fluid to move through the system in the opposite direction, moving according to the solid lines with arrows. The heat transfer fluid thus moves through the heat exchanger 710 where it absorbs heat from a hot working fluid before being pumped into the charging tubes 714 contained within the thermal energy storage tank 702. As the heat transfer fluid moves through the charging tubes 714, heat from the heat transfer fluid is transferred to the thermal energy storage medium contained within the thermal energy storage tank 702. The heat transfer fluid then moves from the thermal energy storage tank 702, through valves 704, and into the heat exchanger 710 where additional heat is transferred to the heat transfer fluid from a hot (e.g., at least hotter than the heat transfer fluid) working fluid. As the heat transfer fluid circulates through the system 700 in the charging configuration, heat is added to the thermal energy storage tank 702, thereby charging the system.

Figure 9:
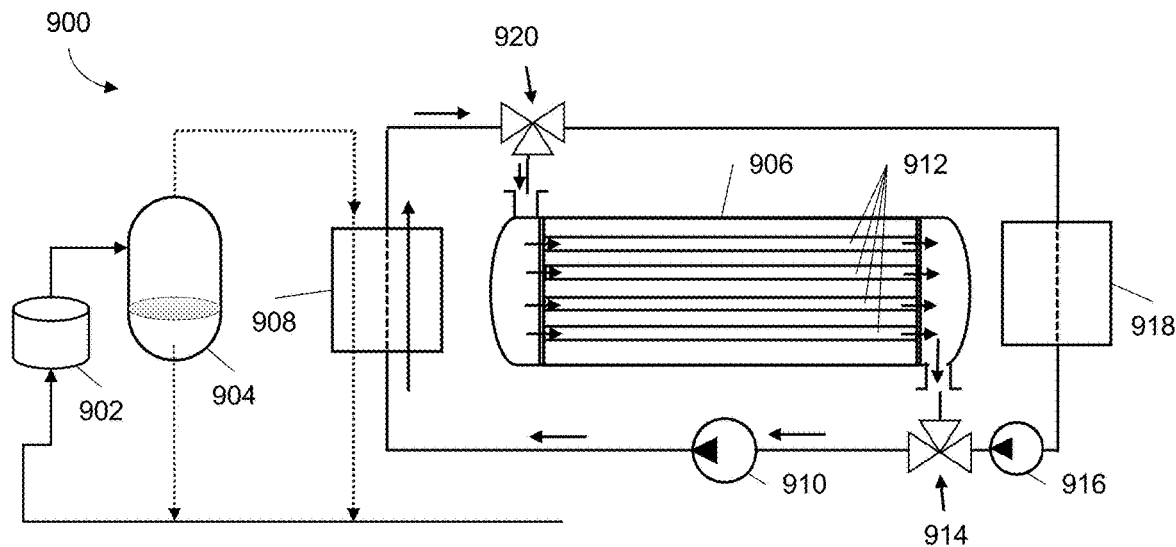
FIG. 9 is a schematic of an embodiment of a thermal energy storage system featuring a steam generator as a heat source.
Figure 10:
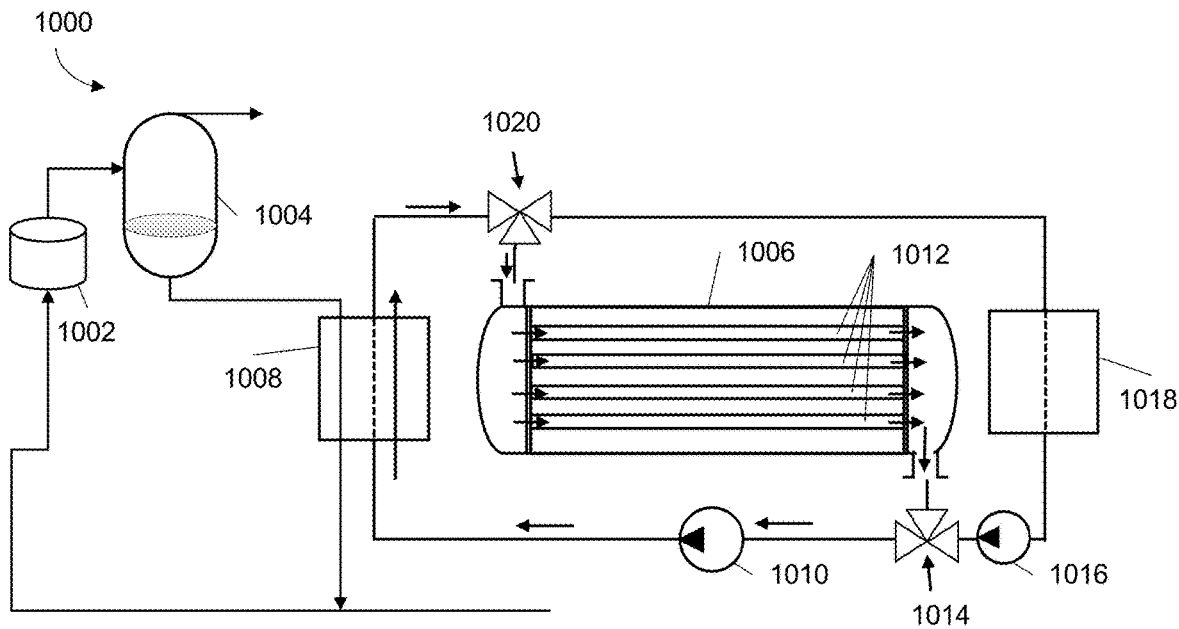
FIG. 10 is a schematic of another embodiment of a thermal energy storage system featuring a steam generator as a heat source.

Finally, FIGS. 9 & 10 show embodiments of the inventive subject matter that include steam generators as heat sources. FIG. 9 shows a system 900 having a steam generator 902, a steam separator 904, a thermal energy storage tank 906, a first heat exchanger 908, a first pump 910, a set of tubes 912 that pass through the thermal energy storage tank 906, a first set of valves 914, a second pump 916, a second heat exchanger 918, and a second set of valves 920. The system 900 is shown in a charging configuration, which means pump 916 and heat exchanger 918 are not activated, and valves 914 & 920 are configured to allow a heat transfer fluid to move through the first heat exchanger 908 and the set of tubes 912 disposed within the thermal energy storage tank 906 to transfer heat from a working fluid to the thermal energy storage medium contained within the thermal energy storage tank 906.

Heat is generated by the steam generator 902, which passes steam along to the steam separator 904, which removes droplets from the steam before passing steam on to the heat exchanger 908. In this embodiment, steam from the steam separator is the working fluid, and heat from the steam is transferred to the heat transfer fluid by the heat exchanger 908, which then moves that heat to the thermal energy storage medium contained within the thermal energy storage tank 906, thereby charging the system 900. The steam separator 904 then recycles fluid that is separated out from the steam back into the steam generator 902. After steam has passed through the heat exchanger 908, it can also be passed back to the steam generator 902 either as steam (e.g., saturated steam) or as a liquid (e.g., water). It is contemplated that the steam generator 902 can also be coupled with a fluid source to add more fluid to the system 900 as needed. Pump 910, as with other embodiments described above, is configured to pump the heat transfer fluid between the heat exchanger 908 and the thermal energy storage tank 906.

The embodiment shown in FIG. 10 is configured largely the same as the system 900 shown in FIG. 9. FIG. 10 shows a system 1000 having a steam generator 1002, a steam separator 1004, a thermal energy storage tank 1006, a first heat exchanger 1008, a first pump 1010, a set of tubes 1012 that pass through the thermal energy storage tank 1006, a first set of valves 1014, a second pump 1016, a second heat exchanger 1018, and a second set of valves 1020. The system 1000 is shown in a charging configuration, which means pump 1016 and heat exchanger 1018 are not activated, and valves 1014 & 1020 are configured to allow a heat transfer fluid to move through the first heat exchanger 1008 and the set of tubes 1012 disposed within the thermal energy storage tank 1006 to transfer heat from a working fluid to the thermal energy storage medium contained within the thermal energy storage tank 1006.

Heat is generated by the steam generator 1002, which passes steam along to the steam separator 1004, which removes droplets from the steam, resulting in hot fluid (e.g., water) that can be passed through the heat exchanger 1008. In this embodiment, fluid from the steam separator is the working fluid, and heat from that fluid is transferred to the heat transfer fluid by the heat exchanger 1008, which then moves that heat to the thermal energy storage medium contained within the thermal energy storage tank 1006, thereby charging the system 1000. The steam separator 1004 then recycles fluid that is separated out from the steam back into the steam generator 1002. After fluid from the steam separator has passed through the heat exchanger 1008, it can also be passed back to the steam generator 1002. It is contemplated that the steam generator 1002 can also be coupled with a fluid source to add more fluid to the system 1000 as needed. Pump 1010, as with other embodiments described above, is configured to pump the heat transfer fluid between the heat exchanger 1008 and the thermal energy storage tank 1006.

As mentioned above, it is contemplated that some systems of the inventive subject matter can accommodate different heat transfer fluids. The system 1100 is configured such that it includes two circulatory subsystems to make it possible for different heat transfer fluids to be used for charging and discharging. An advantage of this configuration is that different heat transfer fluids can have different thermal properties, and thus it can be useful to use one heat transfer fluid during charging and another during discharging to improve efficiencies of those processes.

The system 1100 thus includes a thermal energy storage tank 1102 having two sets of internal tubes 1104 & 1106, where internal tubes 1104 are used for discharging and internal tubes 1106 are used for charging. Thus, in a charging configuration, a first heat transfer fluid is pumped through the portion of the system 1100 depicted on the top in FIG. 11. Discharging pump 1108 motivates the first heat transfer fluid to pass through heat exchanger 1110, moving next into the discharging tubes 1104 contained within the thermal energy storage tank 1112 before recirculating again through the discharging pump 1108 and the heat exchanger 1110. In the discharging configuration, the system 1100 pushes heat transfer fluid that is cooler than the thermal energy storage medium stored in the thermal energy storage tank 1112 so that heat from the thermal energy storage medium can be transferred to the heat transfer fluid, and then when the heat transfer fluid passes through the heat exchanger 1110, heat is transferred from the heat transfer fluid to a working fluid having a lower temperature than the heat transfer fluid.

Figure 11:
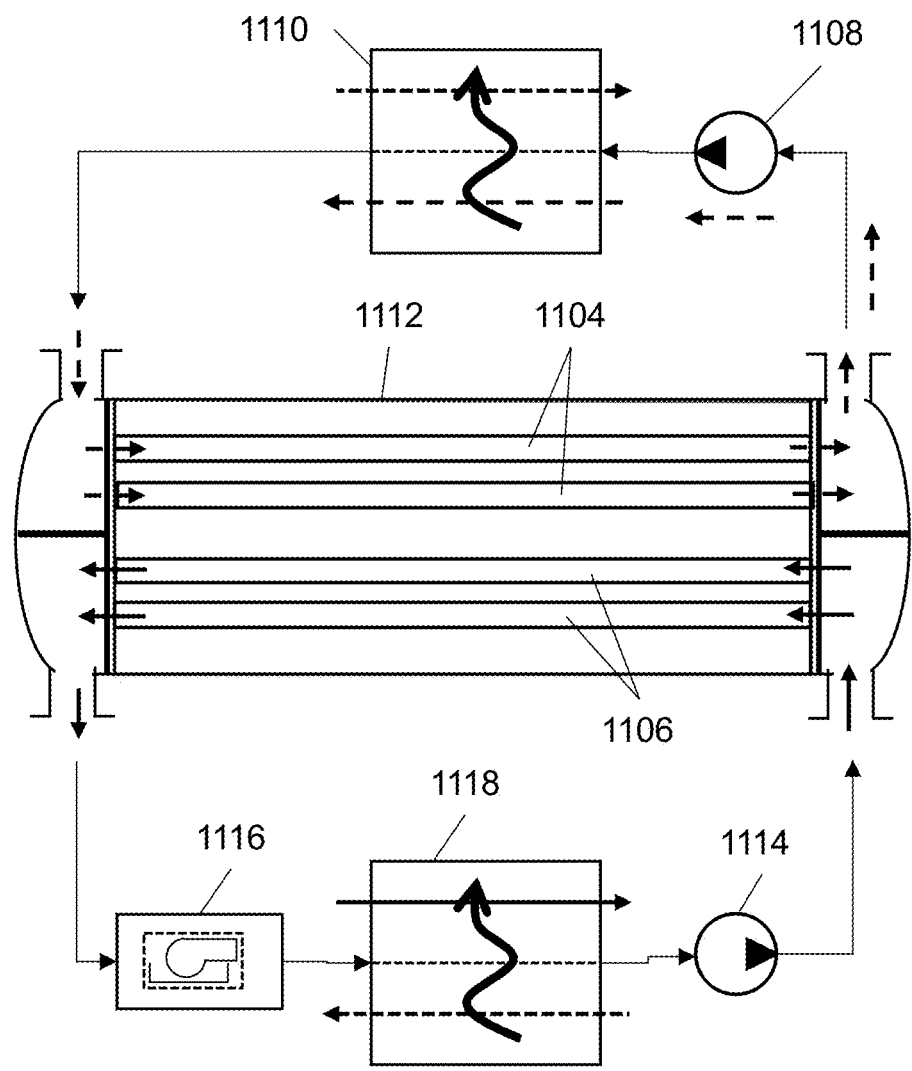
FIG. 11 is a schematic of a thermal energy storage system that uses at least two different heat transfer fluids.

In a charging configuration, the system 1100 activates the portion shown on the bottom half of the schematic in FIG. 11. Thus, pump 1114 motivates a second heat transfer fluid to pass through a second set of tubes 1106 contained within the same thermal energy storage tank 1112. After passing through the thermal energy storage tank 1112, the second heat transfer fluid can pass through an optional burner 1116 before moving into a second heat exchanger 1118 before going back through the pump 1114 to be circulated through the system 1100 again. Of course, pumps 1108 and 1114 can be positioned in a variety of different locations along their respective heat transfer fluid circulatory pathways. In a charging configuration, heat exchanger 1118 takes in hot working fluid. The hot working fluid transfer heat to the second heat transfer fluid, which then moves into tubes 1106 contained within the thermal energy storage tank 1112. Heat then transfers from the second heat transfer fluid to the thermal energy storage medium contained within the thermal energy storage tank 1112. By maintaining two separate heat transfer fluid circulatory pathways, two different heat transfer fluids can be used—one for charging and one for discharging—thereby enabling efficiency improvements that can be gained by optimizing heat transfer fluids for both charging and discharging.

Thus, specific systems directed to thermal energy storage, and methods thereof, have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A thermal energy storage system comprising:
   a thermal energy storage tank configured to contain a thermal energy storage medium;
   a plurality of tubes disposed within the thermal energy storage tank, wherein the plurality of tubes are configured to:
   contain a heat transfer fluid, and
   facilitate heat transfer between the thermal energy storage medium and the heat transfer fluid;
   a heat exchanger coupled with the plurality of tubes, wherein the heat exchanger is configured to facilitate heat transfer between the heat transfer fluid and a working fluid;
   a pump configured to move the heat transfer fluid between the heat exchanger and the plurality of tubes; and
   a second heat exchanger configured to facilitate heat transfer from the heat transfer fluid to a cold working fluid, and wherein the heat exchanger is configured to transfer heat from the working fluid to the heat transfer fluid.

2. The system of claim 1, wherein the thermal energy storage medium comprises molten sulfur.

3. The system of claim 1, wherein the heat transfer fluid comprises a thermal oil.

4. The system of claim 1, wherein the heat transfer fluid comprises a noncorrosive fluid.

5. The system of claim 1, wherein the working fluid contacts the heat exchanger without contacting any other portion of the system.

6. The system of claim 1, wherein the heat transfer fluid transports heat between the working fluid and the thermal energy storage medium.

7. The system of claim 1, further comprising a supplemental burner configured to add heat to the heat transfer fluid as it moves between the thermal energy storage tank and the heat exchanger.

8. A thermal energy storage system comprising:
   a thermal energy storage tank configured to contain a thermal energy storage medium;
   a plurality of tubes disposed within the thermal energy storage tank, wherein the plurality of tubes are configured to:
   contain a heat transfer fluid, and
   facilitate heat transfer between the thermal energy storage medium and the heat transfer fluid;
   a heat exchanger coupled with the plurality of tubes, wherein the heat exchanger is configured to facilitate heat transfer between the heat transfer fluid and a working fluid;
   a pump configured to move the heat transfer fluid between the heat exchanger and the plurality of tubes;
   a second heat exchanger and two sets of valves;
   wherein the two sets of valves are configured to change the system from a charging configuration to a discharging configuration;
   wherein in the charging configuration heat is transferred from the working fluid to the heat transfer fluid to the thermal energy storage medium; and
   wherein in the discharging configuration heat is transferred from the thermal energy storage medium to the heat transfer fluid to a second working fluid.

9. The system of claim 8, wherein the thermal energy storage medium comprises molten sulfur.

10. The system of claim 8, wherein the heat transfer fluid comprises a thermal oil.

11. The system of claim 8, wherein the heat transfer fluid comprises a noncorrosive fluid.

12. The system of claim 8, wherein the heat transfer fluid transports heat between the working fluid and the thermal energy storage medium.

* * * * *